United States Patent [19]
Steele et al.

[11] Patent Number: 5,793,992
[45] Date of Patent: Aug. 11, 1998

[54] METHOD AND APPARATUS FOR ARBITRATING ACCESS TO MAIN MEMORY OF A COMPUTER SYSTEM

[75] Inventors: James C. Steele, Chandler; Barry Davis; Philip Wszolek, both of Phoenix; Brian Fall, Chandler; Swaroop Adusumilli; David Cassetti, both of Tempe; Rodney Pesavento, Chandler; Nick Richardson, Tempe, all of Ariz.

[73] Assignee: VLSI Technology, Inc., San Jose, Calif.

[21] Appl. No.: 664,107

[22] Filed: Jun. 13, 1996

[51] Int. Cl.$^6$ .......................... G06F 13/00; G06F 13/362
[52] U.S. Cl. .................. 395/293; 395/840; 395/841; 395/847; 395/858; 395/306; 395/872; 395/877
[58] Field of Search .................................. 395/293, 840, 395/841, 847, 858, 872, 877, 875, 308, 306, 309

[56] References Cited

U.S. PATENT DOCUMENTS

| | | | |
|---|---|---|---|
| 5,448,701 | 9/1995 | Metz, Jr. et al. | 395/293 |
| 5,455,915 | 10/1995 | Coke | 395/293 |
| 5,506,973 | 4/1996 | Okazawa et al. | 395/306 |
| 5,555,382 | 9/1996 | Thaller et al. | 395/293 |

OTHER PUBLICATIONS

PCI Local Bus Specification, Revision 2.1 Production Version, Jun. 1, 1995.
VLSI Technology, Inc. Product Bulletin, Lynx Desktop Solution for 586–Class Processors, 1995.
VLSI Technology, Inc. Product Bulletin, MESA Lynx/Anigma Reference Design, 1995.
VLSI Technology, Inc. Product Bulletin, Lynx/75 Desktop Solution For 75 MHz, 586–Class Processors, 1996.
Lynx System Controller Internal Architecture Specification, Document No. 05–VL82C541–02, Revision No. 02, VLSI Technology, Inc., Aug. 11, 1995.
VL82C535 Device (Eagle System Controller) Functional Specification, Document No. 05–000029, Revision *B, VLSI Technology, Inc., Jan. 25, 1996.
Ron Wilson, VLSI launches Lynx set for Pentium, Electronic Engineering Times, Jun. 19, 1995, Issue 853.

*Primary Examiner*—Ayaz R. Sheikh
*Assistant Examiner*—Ario Etienne
*Attorney, Agent, or Firm*—Beyer & Weaver, LLP

[57] ABSTRACT

A computer system in which a host bus is relieved from the burdens of data transfers between main memory and devices connected to an input/output (I/O) bus (e.g., peripheral devices). Instead, the invention operates to place most of the burden of the data transfer on an internal bus within a bus arbitration unit so that the host bus is freed up much sooner than conventionally achieved. Further, to reduce stalling of a processor seeking access to the main memory via the host bus and the internal bus, the host bus is able to gain access to the main memory using the internal bus during times in which the internal bus is temporarily not needed by the data transfer between the main memory and the peripheral devices. As a result, the computer system has substantially better performance because the host bus is available for other processing operations instead of being tied up with data transfers with peripheral devices, and because the internal bus is occasionally freed up during the data transfer between the main memory and the peripheral devices.

23 Claims, 8 Drawing Sheets

METHOD AND APPARATUS FOR ARBITRATING ACCESS TO MAIN MEMORY OF A COMPUTER SYSTEM

CROSS-REFERENCE TO RELATED APPLICATION

This application is related to U.S. patent application Ser. No. XXXXX (attorney dkt no. VTI1P150), filed concurrently herewith, entitled "METHOD AND APPARATUS FOR DIRECT ACCESS TO MAIN MEMORY BY AN I/O BUS", naming Steele et al. as inventors, and assigned to the assignee of the present application, and which is hereby incorporated herein by reference for all purposes.

BACKGROUND OF THE INVENTION

1. Field of the Invention

The present invention relates to computer systems, and more particularly, to data transfers with main memory of a computer system.

2. Description of the Related Art

Conventionally, a personal computer system includes a central processing unit (CPU), a cache memory and a main memory. The CPU, the cache memory and the main memory are interconnected by a host bus which is controlled by a host bus master. Consequently, if the CPU is to transfer data to or from the cache memory, it must do so using the host bus. Likewise, when transferring data between the main bus, memory or the cache memory and the CPU, the host bus must also be used.

The conventional personal computer system also includes an input/output (I/O) bus that is controlled by an I/O bus master. Peripheral devices are coupled to the I/O bus. The peripheral devices can issue data requests which request to send data to or receive data from the cache memory or the main memory. However, conventionally, for the I/O bus to transfer the requested data, the host bus master must gain access to the host bus and then utilize the host bus in conjunction with the I/O bus to satisfy the data request by the peripheral device.

One problem with the conventional approach is that to satisfy a data request by a peripheral device, both the I/O bus and the host bus must be tied up while accessing the data in the cache memory or the main memory. As a result, the CPU typically ends up being stalled until the data requested by the peripheral device has been transferred. The stalling of the CPU due to data requests by peripheral devices is a substantial hindrance to the performance of the computer system.

Conventionally, there are two approaches to resolving the contention by the CPU and the peripheral device (I/O bus) for use of the host bus. The first approach puts the CPU into a hold (stop) state to prohibit the CPU from seeking bus cycles on the host bus while the I/O bus has control of the host bus for the data transfer with the peripheral device. This approach gives the I/O bus control over access to the host bus to the exclusion of the CPU. As a result, the CPU cannot interact with either the cache memory or the main memory. The second approach is to limit the length of the data transfer so as to allow the CPU to utilize the host bus periodically during what would otherwise be a long, uninterruptable data transfer. This approach, however, drastically limits the data transfer throughput of the I/O bus and also requires many wasted clock cycles in managing this approach. Hence, the conventional approaches are unsatisfactory solutions to the contention by the CPU and the peripheral device (I/O bus) for use of the host bus.

Thus, there is a need for improved techniques to resolve the contention for access to main memory by the CPU and the peripheral device when both seek to transfer data to or from the main memory.

SUMMARY OF THE INVENTION

Broadly speaking, the invention is an improved technique for use in a computer system to allow a processor and an input/output (I/O) bus to share an internal bus in a manner such that the usage of the internal bus can be interrupted temporarily during a data transfer between main memory and devices connected to the I/O bus so that a processor can perform a data transfer with main memory, yet the performance of the data transfer over the I/O bus is not significantly hampered. Because the invention allows the internal bus to be freed up during the data transfer over the I/O bus, the processor can gain access to main memory during the data transfer over the I/O bus, without having to stall either the processor or the data transfer over the I/O bus. Even if the processor does need to stall, the duration of the stall is substantially shorter than conventionally required. As a result, the computer system has substantially better performance because the internal bus is made available for other processing operations instead of being completely and exclusively tied up with data transfers with devices (e.g., peripheral devices) connected to the I/O bus.

The invention can be implemented in numerous ways, including as a system, apparatus or method. Several embodiments of the invention are described below.

As a computer system, an embodiment of the invention includes: a processor for executing instructions of a computer program; a main memory for storing data at addresses within the main memory; a cache memory for storing a plurality of cache lines, each of the cache lines being associated with an address in the main memory; a host bus for providing a first data transmission path; an I/O bus for providing a second data transmission path; a bus arbitration unit including a buffer for temporarily storing the data of the data request supplied via the I/O bus, and an internal bus for providing a reconfigurable third data transmission path between the host bus and the main memory and/or between the main memory and the buffer and/or between the host bus and the buffer; a host bus manager for controlling the bus arbitration unit to reconfigure the third data transmission path so that data requests from a device coupled to the I/O bus can be fulfilled using the second and third data transmission, for monitoring entries of the buffer, and for temporarily interrupting and reconfiguring the third data transmission path for temporary use by the processor based on the entries of the buffer; and an I/O bus manager operatively connected to the I/O bus and the host bus manager to detect a data transfer request from the device and forward the data transfer request to the host bus manager. a method for transferring data from a memory system of a computer system to another device that has requested the data, an embodiment of the invention operates as follows. The computer system using such an embodiment preferably includes a processor, a cache memory, a main memory, a host bus, an internal bus, a buffer, an I/O bus and a bus controller. The host bus can be coupled to the processor and the cache memory. The internal bus can be coupled to the host bus, the main memory and the buffer. The I/O bus can be coupled to the buffer and the device. The operations of the method include: receiving a read request from the device, the read request having an address associated therewith; obtaining control of the internal bus; transferring data requested by the read request to the buffer using the internal bus; transferring the data held in the buffer from the buffer to the device via the I/O bus, the transferring to the device occurs at least partially concurrently with the transferring to the buffer; and interrupting the transferring to the buffer when the amount of data in the buffer exceeds a predetermined amount and thereafter resuming the transferring to the buffer when the amount of data in the buffer is less than the predetermined amount.

Preferably, the transferring to the buffer includes the operations of: obtaining control of the host bus; snooping the cache memory for a cache line corresponding to the address of the read request; releasing the host bus subsequent to the snooping; transferring the data for the read request from the main memory to the buffer via the internal bus when the snooping indicates a snoop miss for the cache line; and writing back the cache line from the cache memory to the main memory and to the buffer using the internal bus when the snooping indicates a snoop hit for the cache line.

As a method for transferring data to a memory system of a computer system from another device that has requested that the data be transferred, an embodiment of the invention operates as follows. The computer system using such an embodiment preferably includes a processor, a cache memory, a main memory, a host bus, an internal bus, a buffer, an I/O bus and a bus controller. The host bus can be coupled to the processor and the cache memory. The internal bus can be coupled to the host bus, the main memory and the buffer. The I/O bus can be coupled to the buffer and the device. The operations of the method include: receiving a write request from the device, the write request having an address associated therewith; transferring write data associated with the write request from the device to the buffer via the I/O bus; obtaining control of the internal bus; transferring the data of the write request to the main memory from the buffer using the internal bus, the transferring to the main memory occurs at least partially concurrently with the transferring to the buffer; and interrupting the transferring to the main memory when the amount of data in the buffer is less than a predetermined amount and thereafter resuming the transferring to the main memory when the amount of data in the buffer is more than the predetermined amount.

Preferably, prior to the transferring to the main memory, the method includes the operations of: obtaining control of the host bus; snooping the cache memory for the cache line for the address of the write request; releasing the host bus subsequent to the snooping; and writing back the cache line from the cache memory to the main memory when the snooping indicates a snoop hit for the cache line.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF THE INVENTION

Embodiments of the invention are discussed below with reference to FIGS. 1–5C. However, those skilled in the art will readily appreciate that the detailed description given herein with respect to these figures is for explanatory purposes as the invention extends beyond these limited embodiments.

The invention is an improved technique for use in a computer system to allow a processor and an input/output (I/O) bus to share an internal bus in a manner such that the usage of the internal bus can be interrupted temporarily during a data transfer between main memory and devices connected to the I/O bus so that a processor can perform a data transfer with main memory, yet the performance of the data transfer over the I/O bus is not significantly hampered. Because the invention allows the internal bus to be freed up during the data transfer over the I/O bus, the processor can gain access to main memory during the data transfer over the I/O bus, without having to significantly stall either the processor or the data transfer over the I/O bus. Even if the processor does need to stall, the duration of the stall is substantially shorter than conventionally required. As a result, the computer system has substantially better performance because the internal bus is made available for other processing operations instead of being completely and exclusively tied up with data transfers with devices (e.g., peripheral devices) connected to the I/O bus.

Figure 1:
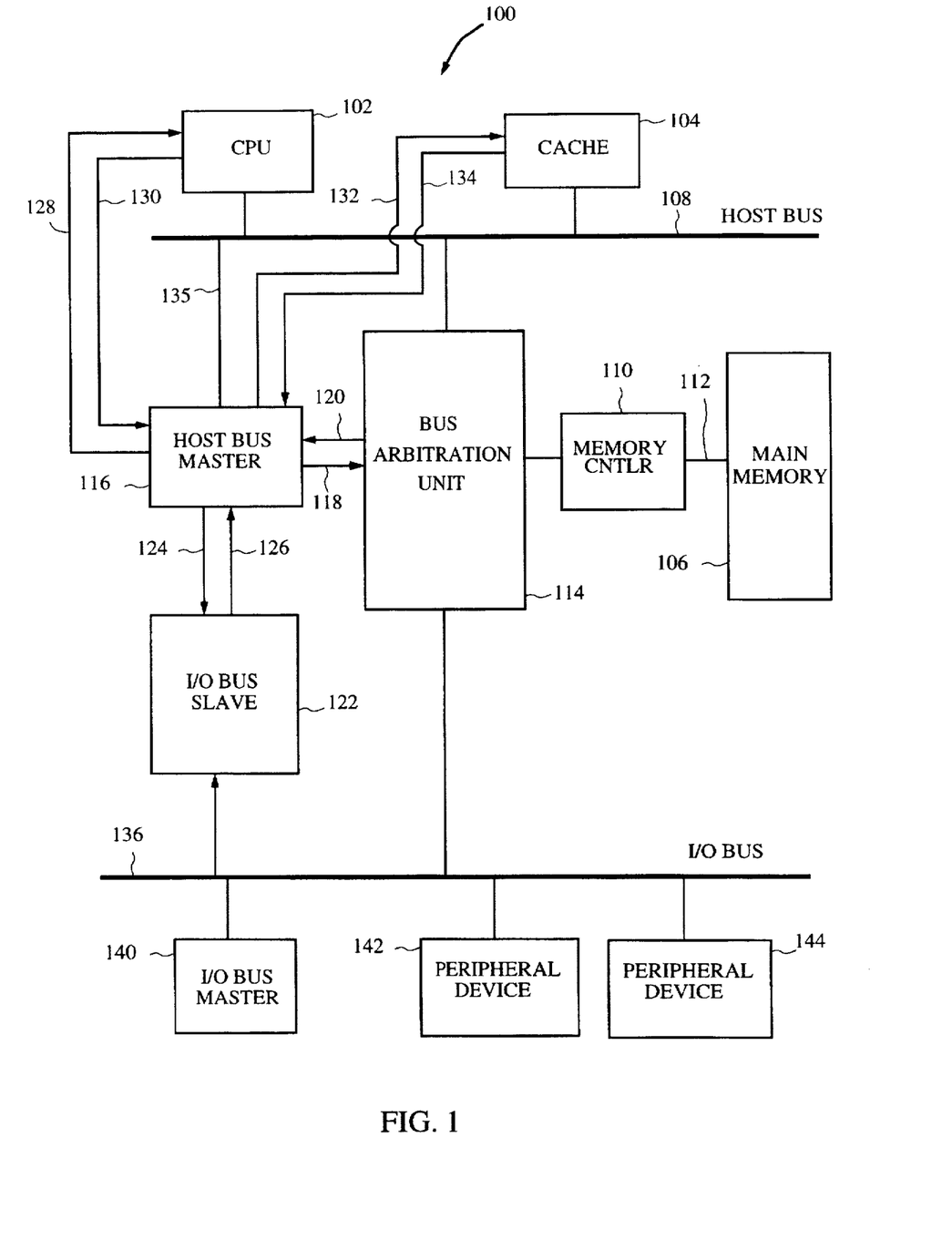
FIG. 1 is a block diagram of a computer system according to an embodiment of the invention.

FIG. 1 is a block diagram of a computer system 100 according to an embodiment of the invention. The computer system 100 includes a central processing unit (CPU) 102, a cache memory 104 and a main memory 106. The CPU 102 and the cache memory 104 are both coupled to the host bus 108. As is conventional, the CPU 102 executes instructions of computer programs, and the cache memory 104 and the main memory 106 store data. The main memory 106 and the cache memory 104 are preferably implemented by static random-access memory (SRAM) or dynamic random-access memory (DRAM), but other types of data storage for electrical signals could also be used. The main memory 106 is substantially larger than the cache memory 104. The data access time for the cache memory 104 is also normally faster than it is for the main memory 106. Cache memories are well known and operate with several different policies. In the exemplary embodiment of the invention discussed below, the cache memory 104 operates as a write back cache, though other cache policies could be used. The cache memory 104 is also illustrated in FIG. 1 as a cache memory that is separate from the CPU 102 but coupled thereto via the host bus 108. However, the cache memory 104 can also be integral with the CPU 102. The cache memory 104 could also have multiple levels, for example, an on-board level-1 cache that is integral with the CPU 102 and a separate level-2 cache that is coupled to the CPU 102 via the host bus 108. For much of the discussion below, it is assumed that cache memory 104 has a single level that is coupled to the CPU 102 via the host bus 108.

The computer system 100 also includes a memory controller 110, a data bus 112, a bus arbitration unit 114 and a host bus master 116. The memory controller 110 operates in a conventional manner to control the storage and retrieval of data from the main memory 106. The data bus 112 couples the memory controller 110 to the main memory 106. Data is passed to and from the main memory 106 by way of the memory controller 110 and the data bus 112. The bus arbitration unit 114 sends and receives control signals 118 and 120 to the host bus master 116.

The host bus master 116 controls operations (tasks) on the host bus 108 and in general provides control signals to perform the operations. The host bus master 116 is coupled to an I/O bus slave 122. The host bus master 116 sends and receives control signals 124 and 126 to and from the I/O bus slave 122. Additionally, the host bus master 116 sends and receives control signals 128 and 130 to and from the CPU 102, and sends and receives control signals 132 and 134 to and from the cache memory 104. In addition, a link 135 couples the host bus master 116 to the host bus 108. The link 135 is used to send and receive control signals (e.g., snoop request) over the host bus 108. Depending on the implementation, any of the control signals 118, 120 and 128–134 can be part of the link 135 or be separated therefrom.

The computer system 100 further includes an I/O bus 136, a link 138, an I/O bus master 140, and peripheral devices 142 and 144. More generally, the peripheral devices 142 and 144 are I/O devices. The I/O bus master 140 and the peripheral devices 142 and 144 are coupled to the I/O bus 136. The peripheral devices 142 and 144 send and receive control signals 146–152 to and from the I/O bus master 140. Examples of the peripheral devices include printers, video boards, tape drives, modems, PC-CARDs, etc. When one of the peripheral devices 142 and 144 issues a data request via the control signals 148 and 152, the I/O bus master 140 forwards the data request to the I/O bus slave 122 using the link 138. Then, the I/O bus slave 122 notifies the host bus master 116 that the data transfer request requires use of the host bus 108 at this time. The host bus master 116 then uses the control signals 128 and 130 as well as the control signals 132 and 134 (or other control signals supplied over the link 135) to disconnect the CPU 102 and the cache memory 104 from the host bus 108. The host bus master 116 also uses the control signals 118 and 120 to cause the bus arbitration unit 114 to grab (couple to) the host bus 108. Once the host bus 108 is coupled to the bus arbitration unit 114, the host bus master 116 causes a cache snoop to occur to the cache memory 104 in accordance with the cache line associated with the data transfer request. Once the cache snoop is completed the host bus 108 can be released (decoupled) so that the CPU 102 can make use of the host bus 108 while the transfer of data between the main memory 106 and a peripheral device via the I/O bus 136.

Moreover, according to the invention, the bus arbitration unit 114 and the host bus master 116 allow the host bus access to the main memory while the I/O data request is otherwise proceeding without immediate need for access to the main memory. The computer system 100 thus enables concurrent, yet separate, usage of the host bus 108 and I/O bus 136 as well as enables the host bus 108 to temporarily access the main memory 106 while the I/O data request is ongoing. In the case in which the cache snoop indicates a cache hit to a dirty cache line, in the exemplary implementation, the dirty cache line from the cache memory 104 is written back to the main memory 106 before the data transfer request is performed. This ensures coherency between the cache memory 104 and the memory 106. The write back operation does, however, require use of the host bus 108 to write the data from the dirty cache line of the cache memory 104 to the main memory 106. When the data transfer request is a read request, the write back preferably writes to the bus arbitration unit 114 for the peripheral device at the same time. Using different cache policies and/or multiple levels of cache memory, memory coherency can be managed differently. Additional details on the operation of the bus arbitration unit 114 and the host bus master 120 in accordance with the present invention are explained in detail below.

Figure 2:
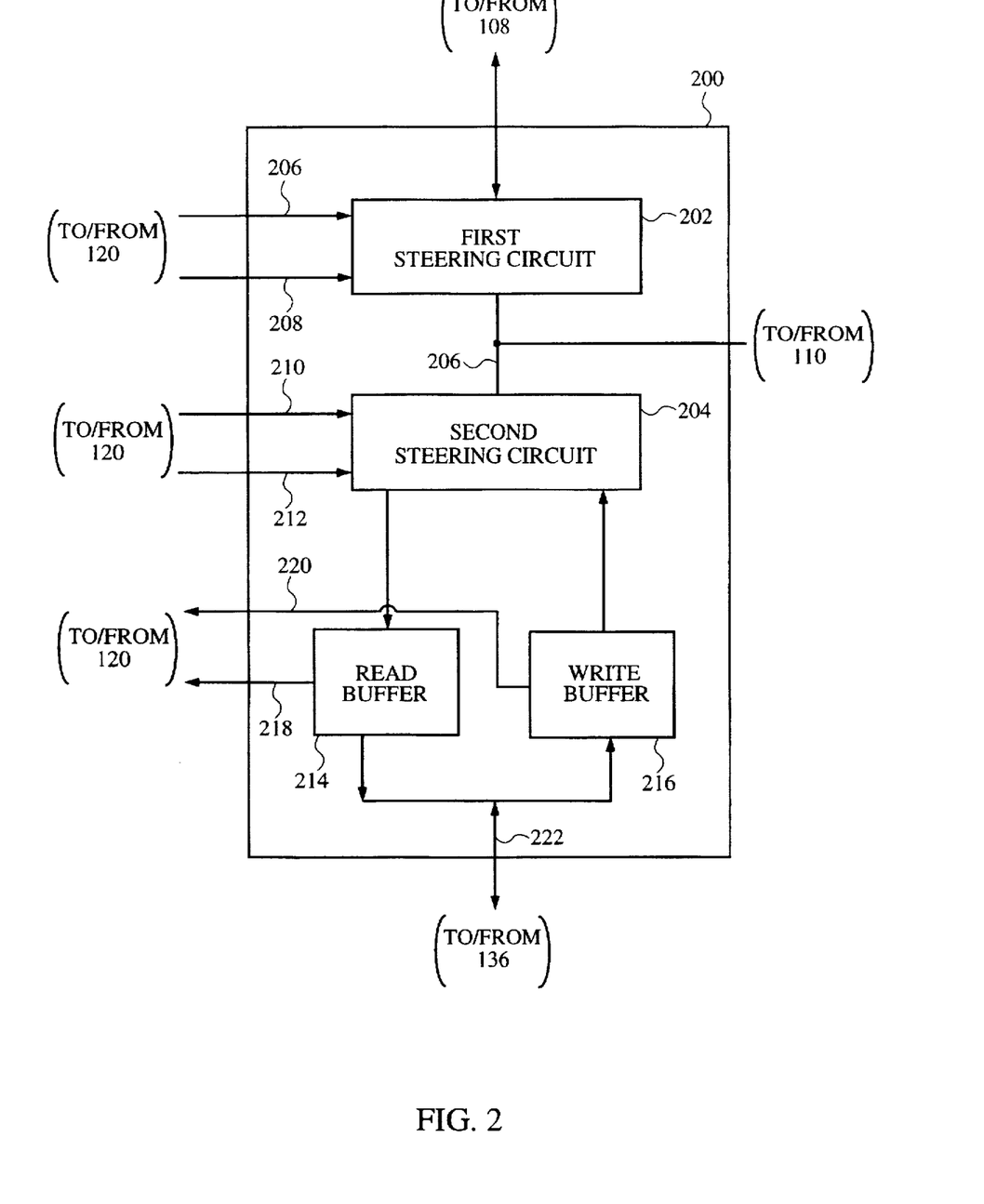
FIG. 2 is a block diagram of a bus arbitration unit according to an embodiment of the invention.

FIG. 2 is a block diagram of a bus arbitration unit 200 according to an embodiment of the invention. The bus arbitration unit 200 is a preferred implementation for the bus arbitration unit 114 illustrated in FIG. 1.

The bus arbitration unit 200 is coupled to the host bus 108, the I/O bus 136, the memory controller 110 and the host bus master 116. The bus arbitration unit 200 includes a first steering circuit 202 and a second steering circuit 204. The first and second steering circuits 202 and 204 are interconnected by an internal bus 206. The internal bus 206 also couples to the main memory 106 via the memory controller 110. The first steering circuit 202 receives control signals 207 and 208 from the host bus master 116. The second steering circuit 204 receives control signals 210 and 212 from the host bus master 116. The control signals 207–212 are included within the control signals 118 and 120 in FIG. 1. These control signals 207–212 control the first and second steering circuits 202 and 204 to determine the direction in which data can flow if at all. Namely, based on the control signals, the first and steering circuits 202 and 204 are individually controllable and can operate to (i) supply data to the internal bus 206, (ii) receive data from the internal bus 206, or (iii) isolate the internal bus 206. The bus arbitration unit 200 further includes a read buffer 214 and a write buffer 216. The read buffer 214 and the write buffer 216 provide temporary storage for data associated with a data request. The read buffer 214 provides a fill level indicator 218 to the host bus master 116, and the write buffer 216 provides a fill level indicator 220 to host bus master 116. The fill level indicators 218 and 220 preferably indicate the number of entries in the respective buffers 214, 216 that contain data and/or otherwise help to indicate when a cache line boundary is crossed. The input to the read buffer 214 is provided by the second steering circuit 204. The output of the read buffer 214 is then forwarded to the I/O bus 136 via a link 222. The input to the write buffer 216 is provided by the I/O bus 136 via the link 222, and the output of the write buffer 216 is forwarded to the second steering circuit 204.

Figure 3:
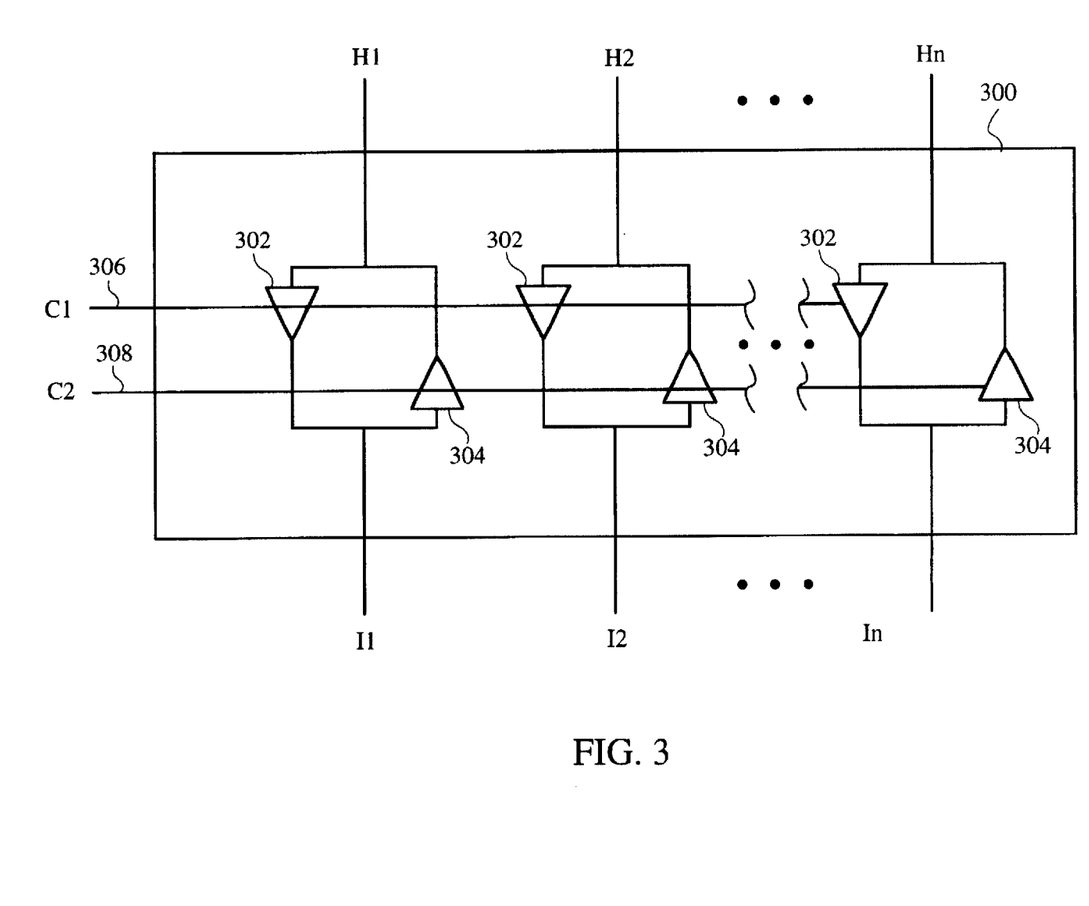
FIG. 3 is a schematic diagram of a steering circuit according to an embodiment of the invention.

FIG. 3 is a schematic diagram of a steering circuit 300 according to an embodiment of the invention. The steering circuit 300 is a preferred implementation for the first steering circuit 202 illustrated in FIG. 2. The steering circuit 204 in FIG. 2 would have a similar design.

The steering circuit 300 is coupled to a bus having n lines. Namely, the steering circuit 300 is interposed between a first bus having lines H1, H2, . . . , Hn and a second bus having lines I1, I2, . . . , In. For each respective pair of bus lines, there is a pair of tri-state buffers 302 and 304 included within the steering circuit 300. The buffers 302 within the steering circuit 300 are controlled by a control line C1 306, and the buffers 304 within the steering circuit 300 are controlled by a control line C2 308. For this embodiment, assume that the buffers 302 and 304 are active on a high signal on the control lines C1 and C2, respectively, and that the buffers 302 and 304 are inactive on a low signal on the control lines C1 and C2, respectively. For example, if the control line C1 306 is high and the control line C2 308 is low, then the buffers 302 are activated and the buffers 304 are deactivated, and the data can pass through the steering circuit 300 from the bus lines H1, H2, . . . , Hn to the bus lines I1, I2, . . . , In, respectively. If, on the other hand, the control line C2 308 is high and the control line C1 306 is low, then the buffers 304 are activated and the buffers 302 are deactivated, and the data can pass through the steering circuit 300 from the bus lines I1, I2, . . . . , In to the bus lines H1, H2, . . . , Hn, respectively. When both the control lines C1 and C2 are both low, then no data passes through the steering circuit 300 as the bus lines of the respective buses are isolated from one another. The control lines C1 304 and C2 308 cannot both be high at the same time. For the second steering circuit 204, the outputs of the buffers 302 and the inputs of the buffers 304 are not coupled together.

Figure 4A:
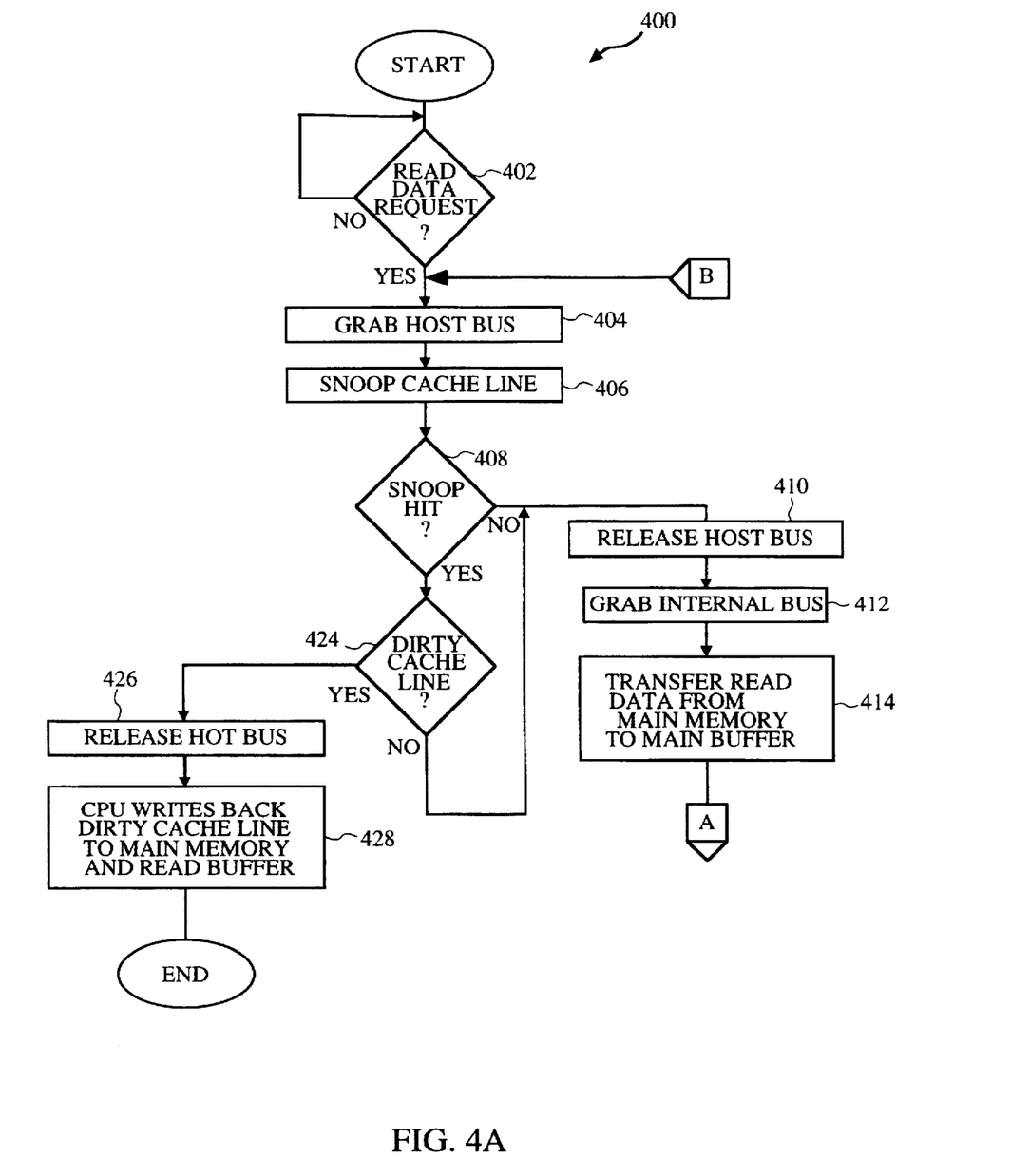
FIGS. 4A and 4B are flow diagrams of read request processing according to an embodiment of the invention.
Figure 4B:
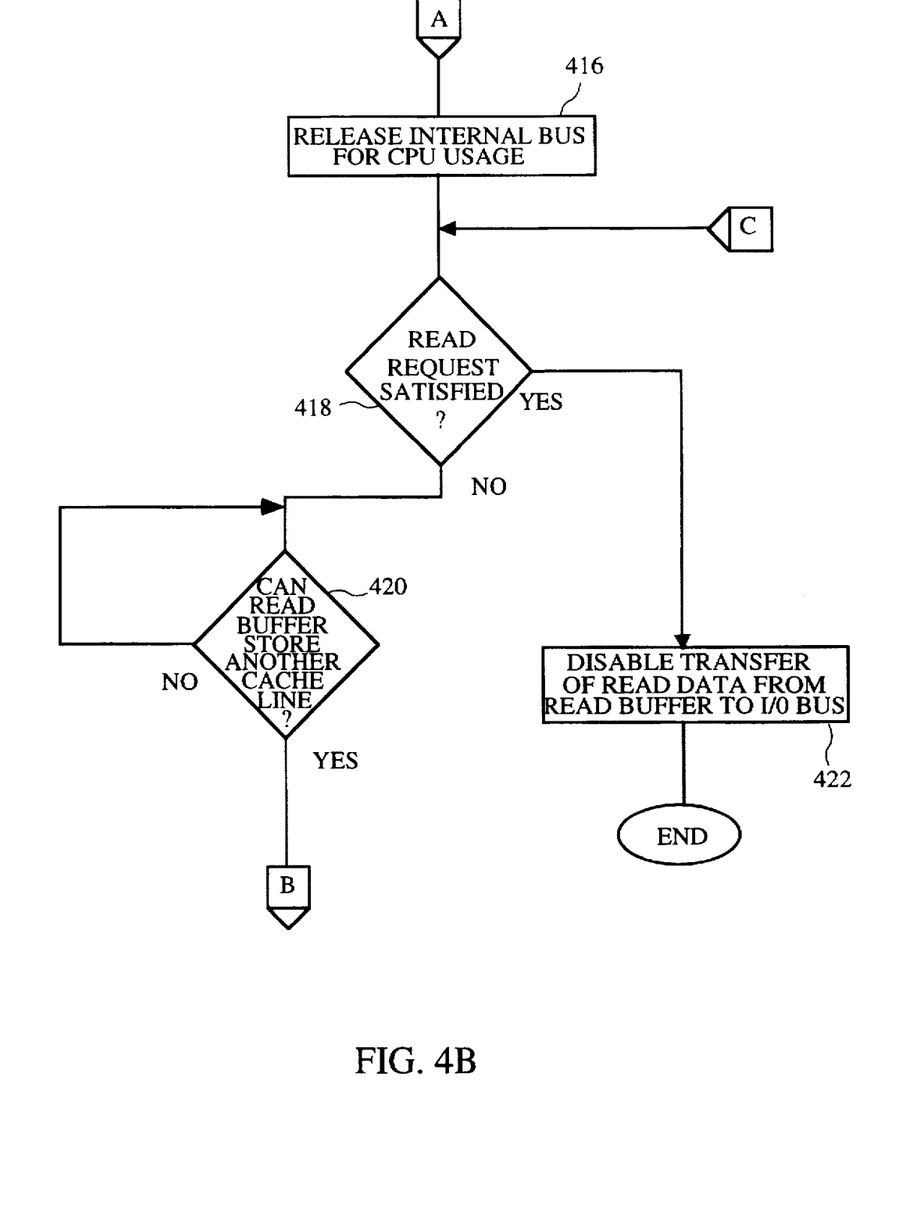

FIGS. 4A and 4B are flow diagrams of read request processing 400 according to an embodiment of the invention. The read request processing 400 is described with respect to the computer system 100 illustrated in FIG. 1 and the bus arbitration unit 200 illustrated in FIG. 2. The read request processing 400 is preferably carried out by the host bus master 116. read request processing 400 begins with a decision block 402 that determines whether a read data request is present from a peripheral device coupled to the I/O bus 136. If a read data request is determined not to be present, the read request processing 400 awaits such a request. Once a read data request is determined to be present, the read request processing 400 grabs 404 (takes control of) the host bus 108. After the host bus 108 is grabbed 404, the cache line associated with the read request is snooped 406. Here, the bus arbitration unit 200 and the host bus master 116 couple to the host bus 108 and sends a snoop request to the cache memory 104 via the host bus 108. Then, a decision 408 determines whether a snoop hit has occurred. In the exemplary embodiment, the host bus master 116 grabs 404 the host bus 108 and snoops 406 the cache line, and then the host bus master 116 and comparison logic of the cache memory 104 determine whether the cache memory 104 currently holds the cache line associated with the read data request. The comparison logic of the cache memory 104 can reside in various places including in the bus arbitration unit 114.

If the decision 408 determines that the snoop hit has not occurred (i.e., snoop miss), then the host bus 108 is released 410. Next, the internal bus 206 is grabbed 412 (taken control of). In the exemplary embodiment, the bus arbitration unit 200 grabs 412 the internal bus 206 to gain access to data in the main memory 106 that is needed to satisfy the read data request from the peripheral device. After releasing the host bus 108 and grabbing the internal bus 206, the data for the read data request begins being transferred (read) 414 from the main memory 106 to the read buffer 214 using the internal bus 206. At this point, the second steering circuit 204 is configured by the control signals 210 and 212 to pass data from the internal bus 206 to the read buffer 214, and the first steering circuit 202 is configured by the control signals 206 and 208 to provide isolation.

Once the transferring 414 begins, the read request processing 400 monitors the extent to which the read buffer 214 is filled. There are numerous ways that the extent to which the read buffer 214 is filled can be monitored. For example, the number of bytes, words or cache lines storing data can by counted, the percentage of storage filled or empty can be determined, or a flag can indicated when the read buffer 214 is filled or empty to a predetermined amount.

Once the transferring 414 has transferred the data for the cache line, the internal bus 206 is released 416. The exemplary embodiment releases 416 the internal bus 206 by causing the second steering circuit 204 to isolate (decouple) the internal bus 206 from the read buffer 214. Next, a decision 418 determines whether the read request has been satisfied. If the read request has yet to be fully satisfied, the decision block 418 causes the read request processing 400 to continue as described below. On the other hand, when the decision block 418 determines that the read request has been fully satisfied, then the transfer of the read data from the read buffer 214 to the I/O bus 136 is disabled 422 because the I/O read data request has been satisfied. In the exemplary embodiment, the I/O bus slave 122 notifies the host bus master 116 when the read request has been satisfied. Following block 422, the read request processing 400 is complete and ends.

Following the decision block 418 when the decision block 418 determines that the read request has not yet been fully satisfied, a decision 420 determines whether the read buffer 214 is full to the extent that it cannot store another cache line. For example, in one possible implementation, the read buffer stores eight (8) quad-words (64 bits) which is at least enough to store two (2) cache lines (four quad-words per cache line). The data for the cache line may be one or more bytes of the cache line. The presence of a cache line in the read buffer 214 is determined by monitoring boundary line crossings. The crossing of a boundary line can be monitored by using the starting address of the data request and the number of entries storing data.

When the decision block 420 determines that the read buffer 214 is relatively full with data for the read request (e.g., does not have room to store another cache line), then the decision block 420 causes the read request processing 400 to repeat block 420 until another the read buffer 214 has room to store another cache line of data. In any case, once the decision block 420 determines that the read buffer 214 can store another cache line of data, the read request processing 400 repeats block 404 and subsequent blocks so as to process a next cache line of the read request.

On the other hand, when the decision block 408 determines that a snoop hit has occurred, a decision 424 determines whether the cache line associated with the snoop hit is dirty. A dirty cache line means that the cache line has been modified since being read in from main memory. If the cache line is not dirty (i.e., clean), then the read request processing 400 performs processing previously described with reference to blocks 410-422 to transfer the data directly from the main memory 106 to the read buffer 214 and then in turn to the I/O bus 136 in route to the peripheral device, while allowing access by the CPU 102 to the main memory 106 via the internal bus 206 under certain conditions.

If, on the other hand, the decision block 424 determines that the cache line is dirty, the host bus 108 is released 426, and then the CPU 102 writes back 428 the dirty cache line to the main memory 106 as well as to the read buffer 214. In other words, the CPU 102 writes back 428 the dirty cache line to both the main memory 106 and the read buffer 214 at the same time. This is achieved by the cache memory placing the data associated with the dirty cache line on the host bus 108, using the first steering circuit 202 to direct data from the host bus 108 to the internal bus 206, using the memory controller 110 to couple the internal bus 206 to the data bus 112 for the main memory 106, and using the second steering circuit 204 to direct data from the internal bus 206 to the read buffer 214. Consequently, because the dirty cache line contains the data requested by the read request, the write back 428 of the dirty cache line concurrently to the main memory 106 and the read buffer 214 provides the needed data to the read buffer 214 very efficiently. Following block 428, the read request processing 400 performs block 418 and subsequent blocks as previously described so as to either end the read request or repeat the processing for another cache line of the read request.

As the data is being transferred for the read data request from the main memory 104 to the read buffer 214, the I/O bus master 140 can cause the data to be read out (streamed out) of the read buffer 214 to the I/O bus 136 and then to the peripheral device that requested the data. The bus speed of the I/O bus 136 is typically slower than the bus speed of the host bus 108. The bus width of the I/O bus 136 may also by smaller than the bus width of the host bus 108. In the exemplary embodiment, the I/O bus 136 is preferably 32 bits, whereas the host bus 108 is 64 bits. Because of the difference in bus speeds, the internal bus 206 is occasionally made available for use by the CPU 102 during the processing of the read data request. Hence, with the benefit of the invention, the computer system 100 is able to operate with greater performance because the CPU 102 will stall less often (or for shorted periods of time) when seeking access to the main memory 106.

Unless the write back occurs (block 428), the transferring 414 of the read data is achieved directly from the main memory 106 to the read buffer 214 via the internal bus 206. In this situation, the CPU 102 is able to use the host bus 108 as soon as it is released 416 by the host bus master 116. Furthermore, the CPU 102 is able to gain access to the main memory 106 via the internal bus 206 when the read buffer 214 is full or nearly fully so that the CPU 102 will have to stall less often. Consequently, it is possible that the read data request by a peripheral device can by efficiently satisfied, while the CPU 102 is able to make use of the host bus 108 and the internal bus 206 to carry out its operations. Hence, the invention yields a substantial performance improvement as compared to conventional approaches.

Figure 5A:
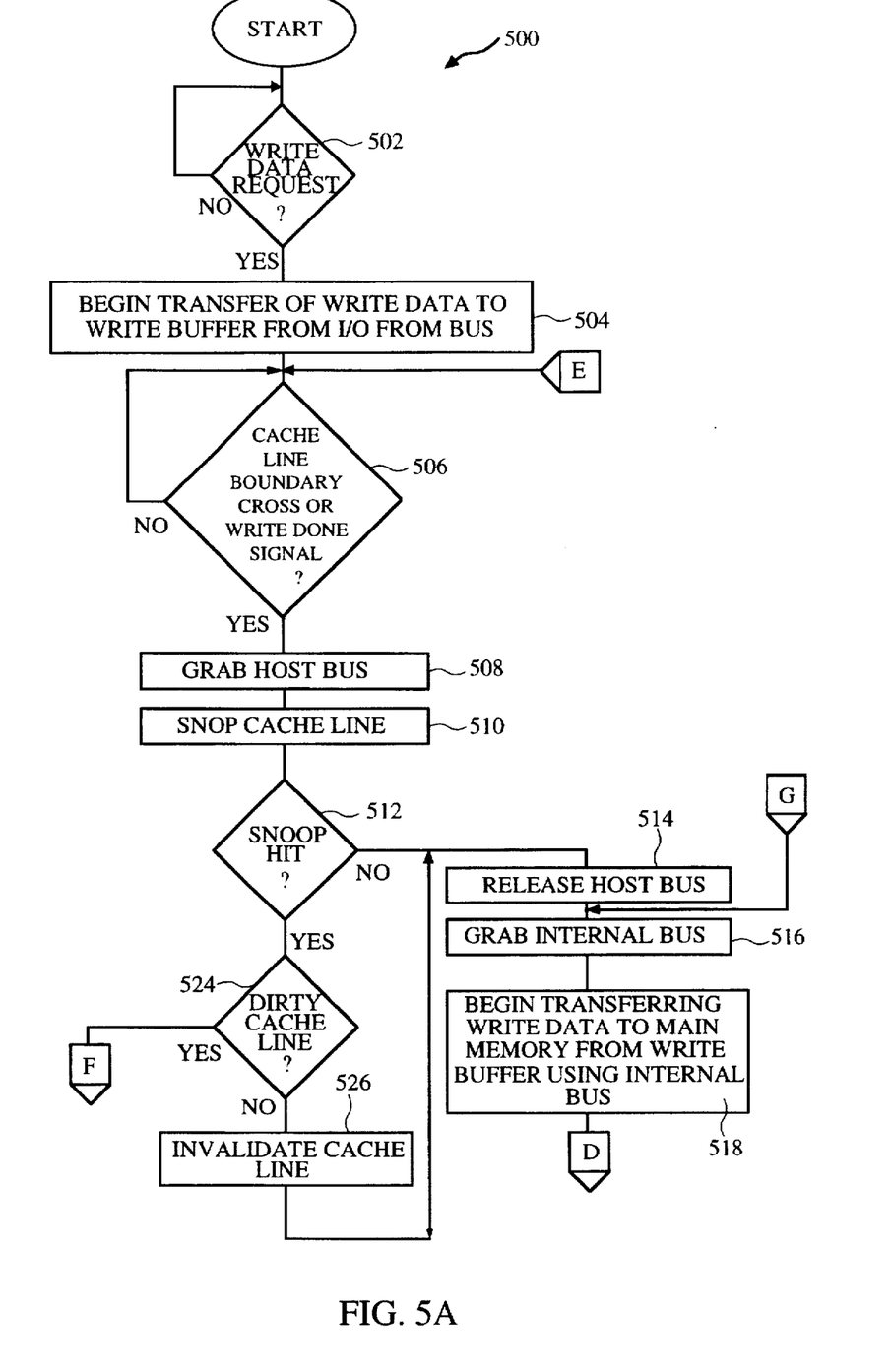
FIGS. 5A, 5B and 5C are flow diagrams of write request processing according to an embodiment of the invention.
Figure 5B:
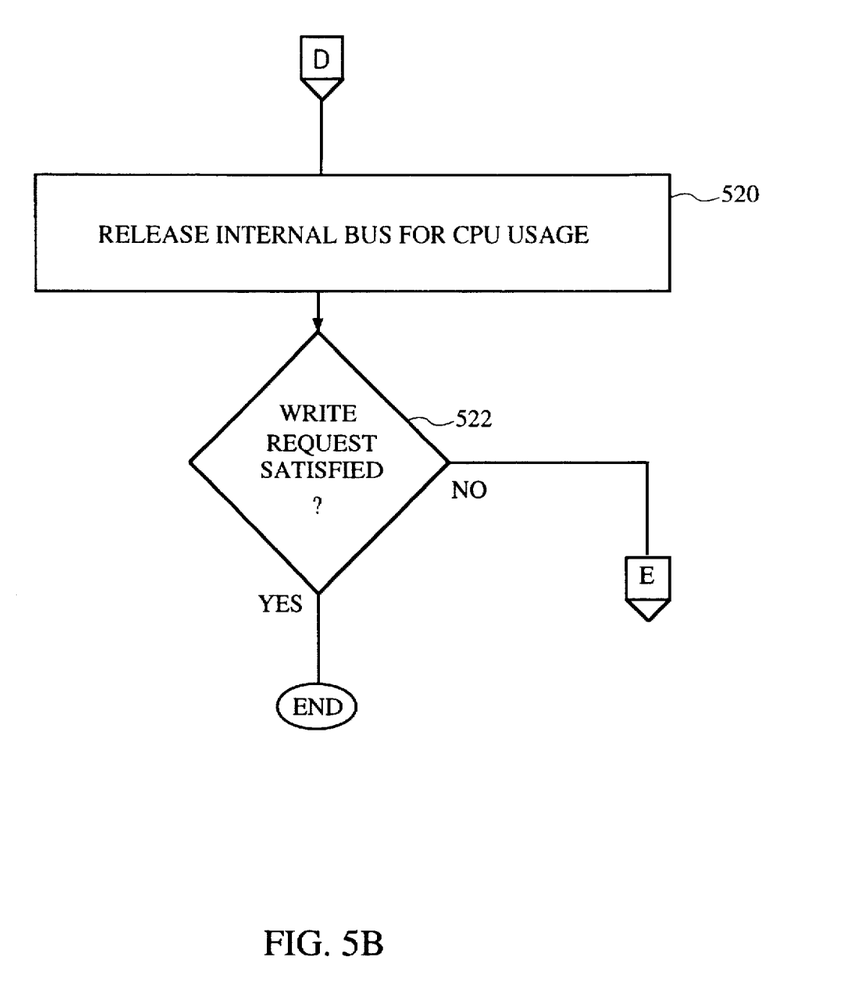
Figure 5C:
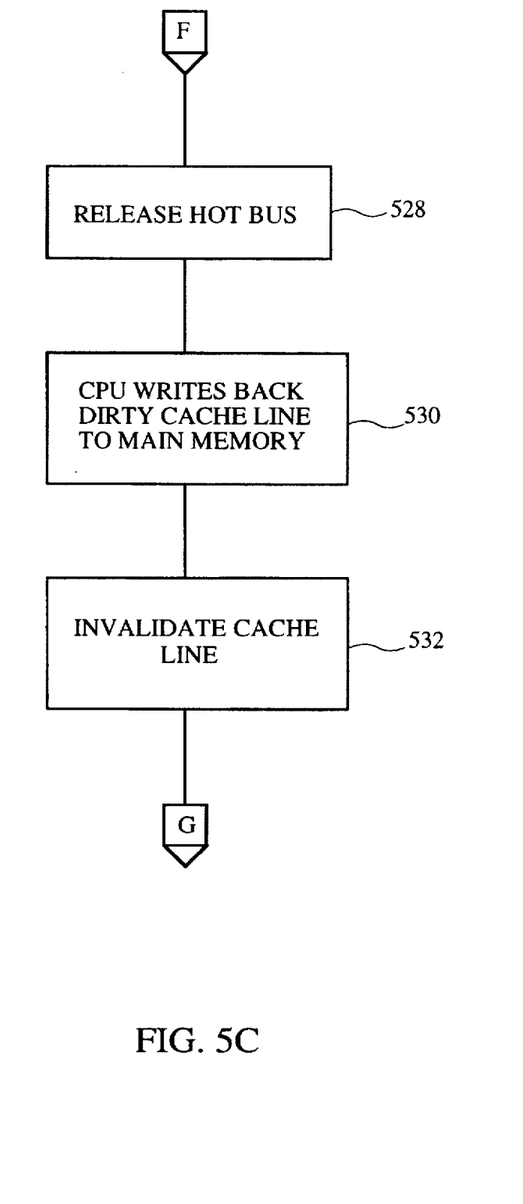

FIGS. 5A–5C are flow diagrams of write request processing 500 according to an embodiment of the invention. The write request processing 500 is described with respect to the computer system 100 illustrated in FIG. 1 and the bus arbitration unit 200 illustrated in FIG. 2.

The write request processing 500 begins with a decision 502 that determines whether a write data request has been issued by a peripheral device coupled to the I/O bus 136. If no write data request has been issued, the decision block 502 causes the write request processing 500 to await such a write data request. Once a write data request has been issued, the write request processing 500 proceeds.

After a write request is issued, the transfer of the write data to the write buffer 216 from the I/O bus 136 begins 504. This transferring occurs at the speed of the I/O bus 136 under the control of the I/O bus master 140 and/or I/O bus slave 122. Once the write request is issued, the transferring can begin and continue until the write buffer 216 becomes full or all the write data has been transferred. While this transferring is occurring, other data transfer operations detailed below are performed.

After beginning 504 the transfer of the write data to the write buffer 216, a decision 506 determines whether a cache line boundary has been crossed or whether a write done signal has been received. When a cache line boundary has been crossed, it means that some or all the bytes of a cache line that are to be written are stored in the write buffer 216. Generally, then crossing a cache line boundary can be thought of as an indication that the write buffer contains at least one cache line, though only a portion of the cache line is to be written to the main memory 106. Also, the decision 506 determines whether the write done signal is received so that the write request processing 500 can determine that all the remaining data to be written resides within the write buffer 216. Hence, if the write buffer 216 does not contain at least one cache line (boundary line crossing) that is ready to be written to the main memory 106, the write request processing 500 waits for the write buffer 216 to contain additional data, unless a write done signal has been received. In any event, once a cache line boundary has been crossed or a write done signal has been received, the write request processing 500 continues.

There are numerous ways that the extent to determine whether there is a cache line within the write buffer 216 that is ready to be written to the main memory 106. For example, the number of bytes, words or cache lines storing data can by counted, the percentage of storage filled or empty can be determined, or a flag can indicated when the write buffer 216 is filled or empty to a predetermined amount. In the exemplary embodiment, the decision block 506 determines whether the write buffer 216 contains at least one unit of data that is ready to be written to the main memory 106. This unit of data is a cache line, but not all bytes within the cache line need to be written. For example, in one possible implementation, the read buffer 216 stores eight (8) quad-words (64 bits) which is enough to store two (2) complete cache lines (four quad-words per cache line). The data for the cache line may be one or more bytes of the cache line. The presence of a cache line in the write buffer 216 is determined by monitoring cache line boundary crossings. The crossing of a boundary line can be monitored using the starting address of the write request and the number of entries storing data. The detection of a boundary line cross means that the portion of a cache line that is to be written has been written into the write buffer 216 and is ready to be transferred to the main memory 106.

When the processing continues, the host bus is grabbed 508. Preferably, the host bus master 116 grabs 508 (takes control of) the host bus 108. Then, the cache line for the data within the write buffer 216 is snooped 510 to the cache memory 104 to determine if the cache line is currently in the cache memory 104. Here, the bus arbitration unit 200 or the host bus master 116 couples to the host bus 108 and sends a snoop request to the cache memory 104 via the host bus 108. A decision 512 then determines whether a snoop hit has occurred. In the exemplary embodiment, the host bus master 116 grabs 508 the host bus 108 and snoops 510 the cache line, and then the host bus master 116 and comparison logic of the cache memory 104 determine whether the cache memory 104 currently holds a cache line associated with the write request. The comparison logic of the cache memory 104 can reside in various places including in the bus arbitration unit 114.

If a snoop hit did not occur (i.e., snoop miss occurred), then the host bus is released 514. The exemplary embodiment releases 514 the internal bus 206 by causing the second steering circuit 204 to isolate (decouple) the internal bus 206 from the write buffer 216. The internal bus is then grabbed 516. In the exemplary embodiment, the bus arbitration unit 200 grabs 516 the internal bus 206 to gain access to data in the main memory 106 to complete the write request from the peripheral device. After releasing the host bus 514 and grabbing the internal bus 516, the data for the detected cache line of the write data request begins is transferred 518 (written) from the write buffer 216 to the main memory 106 using the internal bus 206. At this point, the second steering circuit 204 is configured by the control signals 210 and 212 to pass data from the write buffer 216 to the internal bus 206, and the first steering circuit 202 is configured by the control signals 206 and 208 to provides isolation.

Next, the internal bus is released 520 so that the CPU 102 may make use of the internal bus 206. Next, a decision 522 determines whether the write request has been satisfied. If the write request has not been fully satisfied, the write request processing 500 returns to repeat block 506 and subsequent blocks. On the other hand, when the write request has been fully satisfied, the write request processing 500 is complete and ends.

On the other hand, if the decision block 512 determines that a snoop hit has occurred, then a decision 524 determines whether the cache line associated with the write data request is dirty. If the cache line is determined to not be dirty (i.e., clean), then the cache line is invalidated 526 and then block 514 and subsequent blocks are carried out because, in this implementation, the I/O write data request is directly written to the main memory 106 and not to the cache memory 104 which is the same processing as occurs when there is a snoop miss.

If, on the other hand, the cache line is dirty, then the host bus is released 528 and the CPU 102 writes back 530 the dirty cache line to the main memory 106. The dirty cache line is also invalidated 532. Thereafter, the write request processing 500 repeats block 516 and subsequent blocks to carry out the remaining processing associated with the write request processing 500.

In the exemplary embodiment, the cache line is invalidated 526, 532 because the data of the write data request is being written directly to the main memory 106 and once this is achieved, the cache line would be invalid because it no longer corresponds to the contents of the main memory 106. These operations occur in the exemplary embodiment because the write data request is written directly to the main memory 106, and that the data being written to the main memory 106 may not modify all the bytes within the cache line.

For example, in a Pentium® type computer system, following a snoop to a cache line, the cache line is automatically written back to the main memory 106. Here, in the exemplary embodiment, the write back is also done, but the host bus 108 is acquired for the write back operation and then released as soon as the write back is complete. The write back 530 ensures that the contents of the main memory 106 following the write request processing 500 will contain the accurate values of the byte or the cache line.

Here, the write data is stored to the main memory 106 without having to use the host bus 108, so that at the same time, the CPU 102 is able to use the host bus 108 to perform its operations, thus yielding a substantial performance increase over conventional approaches to accessing memory via the I/O bus 136.

In this manner of processing, the internal bus 206 is released when the write buffer 216 does not contain enough data to be written to the main memory 106. In this case the data can be written to the main memory 106 faster than the data can be supplied to the write buffer 216 from the I/O bus 136. As a result, the write buffer 216 can fill up or fill partially while the internal bus 206 is being used by the CPU 102, and then once the write buffer 216 is sufficiently full, the internal bus 206 can be reacquired so that the data transfer from the write buffer 216 to the main memory 106 can occur. Note also that when the decision block 512 determines that a snoop hit has not occurred (i.e., a snoop miss) and the host bus 108 is released 514, the write data is transferred 518 to main memory 106 from the write buffer 216 using the internal bus 206. Here, the write data is stored to the main memory 106 without having to use the host bus 108, so that at the same time, the CPU 102 is able to use the host bus 108 to perform its operations, thus yielding a substantial performance increase over conventional approaches to accessing memory via the I/O bus 136.

In the case in which the cache memory 104 of the computer system 100 has an on-board level-1 cache that is integral with the CPU 102 and a separate level-2 cache that is coupled to the CPU 102 via the host bus 108, the cache coherency management is performed slightly different. The cache snoop is to both the level-1 cache and the level-2 cache. For sake of discussion, it is assumed that the level-1 cache performs the automatic write back after a snoop but that the level-2 cache does not perform automatic write back and lacks valid indicators. Hence, the host bus master 116 is used to manage the of the level-2 cache. Namely, one approach to manage a level-2 cache is as follows, but those in the art should recognize that many other approaches can be used.

With a read data request, when there is a cache miss in the level-1 cache and a cache hit in the level-2 cache, then the host bus master 116 reads the cache line from the level-2 cache using the host bus 108 and the steering circuits 202 and 204 within the bus arbitration unit 114 direct the data to the main memory 106 and the read buffer 214. On the other hand, if there is a cache hit at both levels and the cache line in level-1 is dirty, then the automatic write back to the main memory 106 is performed for the dirty cache line in the level-1 cache and, while the automatic write back occurs, the level-2 cache and the read buffer 214 may also receive the data via the internal bus 206 and the host bus 108. Of course, the write back operation in this case could instead just update the level-2 cache and the read buffer 214 (and not the main memory 106).

With a write request, when there is a cache miss in the level-1 cache and a cache hit in the level-2 cache, then the host bus master 116 writes the data of the write data request to the cache line from the write buffer 216 to the level-2 cache using the host bus 108 and the steering circuits 202 and 204 within the bus arbitration unit 114. On the other hand, if there is a cache hit at both levels and the cache line in level-1 is dirty, then the automatic write back is performed for the dirty cache line in the level-1 cache to the level-2 cache using the host bus 108, and then the data of the write data request is written from the write buffer 216 to the cache line in the level-2 cache using the host bus 108 and the steering circuits 202 and 204 within the bus arbitration unit 114.

It should be noted that the invention improves performance of a computer system by making a host bus more available for a processor's usage during data requests from peripheral devices coupled to an I/O bus. A cache memory is part of the computer system but is not directly used to achieve the performance advantage of the invention. Cache memories are well known and operate with several different policies. Hence, the above discussion of cache memories used in the computer system are only representative though perhaps preferred for the exemplary implementation.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A computer system comprising:
   a processor for executing instructions of a computer program;
   a main memory for storing data at addresses within said main memory;
   a cache memory for storing a plurality of cache lines, each of the cache lines being associated with an address in said main memory;
   a host bus for providing a first data transmission path;
   an I/O bus for providing a second data transmission path;
   a bus arbitration unit operatively connect to said main memory, said host bus and said I/O bus, said bus arbitration unit including
      a buffer for temporarily storing the data of the data request supplied via said I/O bus; and
      an internal bus, operatively connectable to said host bus, said main memory, and said buffer, for providing a reconfigurable third data transmission path between said host bus and said main memory, between said main memory and said buffer, or between said host bus and said buffer;
   a host bus manager, operatively connected to said bus arbitration unit, said processor and said cache memory, for controlling said bus arbitration unit to reconfigure the third data transmission path so that data requests from a device coupled to said I/O bus can be fulfilled using the second and third data transmission paths, for monitoring entries of said buffer, and for temporarily interrupting and reconfiguring the third data transmission path for temporary use by said processor based on the entries of said buffer; and
   an I/O bus manager operatively connected to the I/O bus and said host bus manager to detect a data transfer request from the device and forward the data transfer request to said host bus manager.

2. A computer system comprising:
   a processor for executing instructions of a computer program;
   a main memory for storing data at addresses within said main memory;
   a cache memory for storing a plurality of cache lines, each of the cache lines being associated with an address in said main memory;
   a host bus for providing a first data transmission path;
   an I/O bus for providing a second data transmission path;
   a bus arbitration unit operatively connect to said main memory, said host bus and said I/O bus, said bus arbitration unit including
      a buffer for temporarily storing the data of the data request supplied via said I/O bus; and
      an internal bus, operatively connectable to said host bus, said main memory, and said buffer, for providing a reconfigurable third data transmission path between said host bus and said main memory, between said main memory and said buffer, or between said host bus and said buffer;
   a host bus manager, operatively connected to said bus arbitration unit, said processor and said cache memory, for controlling said bus arbitration unit to reconfigure the third data transmission path so that data requests from a device coupled to said I/O bus can be fulfilled using the second and third data transmission paths, for monitoring entries of said buffer, and for temporarily interrupting and reconfiguring the third data transmission path for temporary use by said processor based on the entries of said buffer, said host bus manager determines an amount of the data held in said buffer; compares the amount of the data held in said buffer with a predetermined amount to produce a comparison result; and releases said internal bus based on the comparison result; and
   an I/O bus manager operatively connected to the I/O bus and said host bus manager to detect a data transfer request from the device and forward the data transfer request to said host bus manager.

3. A computer system as recited in claim 2, wherein said host bus manager further subsequently reacquires said internal bus based on the comparison result.

4. A computer system comprising:
   a processor for executing instructions of a computer program;
   a main memory for storing data at addresses within said main memory;
   a cache memory for storing a plurality of cache lines, each of the cache lines being associated with an address in said main memory;
   a host bus for providing a first data transmission path;
   an I/O bus for providing a second data transmission path;
   a bus arbitration unit operatively connect to said main memory, said host bus and said I/O bus, said bus arbitration unit including
      a buffer for temporarily storing the data of the data request supplied via said I/O bus; and
      an internal bus, operatively connectable to said host bus, said main memory, and said buffer, for providing a reconfigurable third data transmission path between said host bus and said main memory, between said main memory and said buffer, or between said host bus and said buffer;
   a host bus manager, operatively connected to said bus arbitration unit, said processor and said cache memory, for controlling said bus arbitration unit to reconfigure the third data transmission path so that data requests from a device coupled to said I/O bus can be fulfilled using the second and third data transmission paths, for monitoring entries of said buffer, and for temporarily interrupting and reconfiguring the third data transmission path for temporary use by said processor based on the entries of said buffer; and
   an I/O bus manager operatively connected to the I/O bus and said host bus manager to detect a data transfer request from the device and forward the data transfer request to said host bus manager,
   wherein said host bus manager issues a cache snoop to said cache memory using the first transmission path of said host bus, and
   wherein, in the case of a snoop miss, said bus arbitration unit decouples from said host bus because the first transmission path is not used in fulfilling the data request, thereby freeing said host bus for use by said processor while the data request is being fulfilled.

5. A computer system as recited in claim 4, wherein, in the case of a snoop hit, said bus arbitration unit provides the reconfigurable third data transmission path between said host bus and said buffer and between said host bus and said main memory, while the data from said cache memory associated with the cache snoop is being written back, but after the write back said bus arbitration unit decouples from said host bus.

6. A computer system comprising:
   a processor for executing instructions of a computer program;
   a main memory for storing data at addresses within said main memory;
   a cache memory for storing a plurality of cache lines, each of the cache lines being associated with an address in said main memory;
   a host bus for providing a first data transmission path;
   an I/O bus for providing a second data transmission path;
   a bus arbitration unit operatively connect to said main memory, said host bus and said I/O bus, said bus arbitration unit including
      a buffer for temporarily storing the data of the data request supplied via said I/O bus;
      an internal bus, operatively connectable to said host bus, said main memory, and said buffer, for providing a reconfigurable third data transmission path between said host bus and said main memory, between said main memory and said buffer, or between said host bus and said buffer;
      a first steering circuit for coupling or decoupling said host bus to said internal bus; and
      a second steering circuit for coupling or decoupling said internal bus to said buffer storage device;
   a host bus manager, operatively connected to said bus arbitration unit, said processor and said cache memory, for controlling said bus arbitration unit to reconfigure the third data transmission path so that data requests from a device coupled to said I/O bus can be fulfilled using the second and third data transmission paths, for monitoring entries of said buffer, and for temporarily interrupting and reconfiguring the third data transmission path for temporary use by said processor based on the entries of said buffer; and
   an I/O bus manager operatively connected to the I/O bus and said host bus manager to detect a data transfer request from the device and forward the data transfer request to said host bus manager.

7. A method for transferring data from a memory system of a computer system to a device that has requested the data, the computer system includes a processor, a cache memory, a main memory, a host bus, an internal bus, a buffer, an I/O bus and a bus controller, the host bus can be coupled to the processor and the cache memory, the internal bus can be coupled to the host bus, the main memory and the buffer, and the I/O bus can be coupled to the buffer and the device, said method comprising the operations of:
   (a) receiving a read request from the device, the read request having an address associated therewith;
   (b) obtaining control of the internal bus;
   (c) transferring data requested by the read request to the buffer using the internal bus;
   (d) transferring the data held in the buffer from the buffer to the device via the I/O bus, said transferring (d) occurs at least partially concurrently with said transferring (c); and
   (e) interrupting said transferring (c) when the amount of data in the buffer exceeds a predetermined amount and thereafter resuming said transferring (c) when the amount of data in the buffer is less than the predetermined amount.

8. A method as recited in claim 7, wherein the predetermined amount is based on a cache line of the cache memory.

9. A method as recited in claim 7, wherein said transferring (c) is from the main memory to the buffer using the internal bus.

10. A method as recited in claim 7, wherein said transferring (c) comprises the operations of:
   obtaining control of the host bus;
   snooping the cache memory for a cache line corresponding to the address of the read request;
   releasing the host bus subsequent to said snooping;
   transferring the data for the read request from the main memory to the buffer via the internal bus when and said snooping indicates a snoop miss for the cache line; and
   writing back the cache line from the cache memory to the main memory and to the buffer using the internal bus when said snooping indicates a snoop hit for the cache line.

11. A method as recited in claim 10, wherein said releasing of the host bus enables the processor to control and utilize the host bus during said transferring (c).

12. A method as recited in claim 7, wherein said interrupting (e) of said transferring (c) the data over the internal bus releases the internal bus during said interrupting (e), thereby enabling the processor to use the internal bus for other data transfer operations with the main memory concurrently with said transferring (d).

13. A method as recited in claim 12, wherein said interrupting (e) ceases after said transferring (c) has transferred all the data for the read request to the buffer.

14. A method as recited in claim 7, wherein said transferring (d) continues even when said transferring (c) is interrupted.

15. A method as recited in claim 7, wherein said method further comprises:
   (f) finally releasing the internal bus after said transferring (c) has transferred all the data requested by the read request to the buffer.

16. A method for transferring data to a memory system of a computer system from a device that has requested that the data be transferred, the computer system includes a processor, a cache memory, a main memory, a host bus, an internal bus, a buffer, an I/O bus and a bus controller, the host bus can be coupled to the processor and the cache memory, the internal bus can be coupled to the host bus, the main memory and the buffer, and the I/O bus can be coupled to the buffer and the device, said method comprising:
   (a) receiving a write request from the device, the write request having an address associated therewith;
   (b) transferring write data associated with the write request from the device to the buffer via the I/O bus;
   (c) obtaining control of the internal bus;
   (d) transferring the data of the write request to the main memory from the buffer using the internal bus, said transferring (d) occurs at least partially concurrently with said transferring (b); and
   (e) interrupting said transferring (d) when the amount of data in the buffer is less than a predetermined amount and thereafter resuming said transferring (d) when the amount of data in the buffer is more than the predetermined amount.

17. A method as recited in claim 16, wherein the predetermined amount is based on a cache line of the cache memory.

18. A method as recited in claim 16, wherein prior to said transferring (d), said method comprises:
   obtaining control of the host bus;
   snooping the cache memory for the cache line corresponding to the address of the write request;
   releasing the host bus subsequent to said snooping; and writing back the cache line from the cache memory to the main memory when said snooping indicates a snoop hit for the cache line.

19. A method as recited in claim 18, wherein said releasing of the host bus enables the processor to control and utilize the host bus during said transferring (d), and wherein said interrupting (e) of said transferring (d) over the internal bus releases the internal bus during said interrupting, thereby enabling the processor to use the internal bus for other data transfer operations with the main memory concurrently with said transferring (b).

20. A method as recited in claim 16, wherein said releasing of the host bus enables the processor to control and utilize the host bus during said transferring (b).

21. A method as recited in claim 16, wherein said interrupting (e) of said transferring (d) over the internal bus releases the internal bus during said interrupting, thereby enabling the processor to use the internal bus for other data transfer operations with the main memory concurrently with said transferring (b).

22. A method as recited in claim 16, wherein said transferring (b) continues even when said transferring (d) is interrupted, and wherein said interrupting (e) ceases after said transferring (b) has transferred all the data for the write request to the buffer.

23. A method as recited in claim 16, wherein said method further comprises:

(f) finally releasing the internal bus after said transferring (d) completes the transfer of the data of the write request to the main memory.

* * * * *